Patented Sept. 23, 1952

2,611,749

UNITED STATES PATENT OFFICE 2,611,749

PREPARATION OF AN ALUMINA-PLATINUM-COMBINED HALOGEN CATALYST

Vladimir Haensel, Hinsdale, Ill., assignor to Universal Oil Products Company, Chicago, Ill., a corporation of Delaware No Drawing. Application September 4, 1948, Serial No. 47,944

12 Claims. (Cl. 252—442)

This invention relates to a process for the production of platinum-containing catalysts and to a novel composition of matter comprising said catalyst. More specifically, the invention concerns a particular method of precipitating platinum sulfide in finely divided particles which when composited with a suitable supporting material forms an exceptionally active catalytic composite for use in various conversion reactions in which the reaction rate is enhanced by the catalytic action of the platinum composite.

An object of this invention is to provide an alumina-halogen-platinum composite useful in catalyzing certain conversion reactions, particularly hydrocarbon conversions in which hydrogen takes part in the reaction mechanism, such as a hydrocarbon reforming process.

Another object of the invention is to provide a method of preparing a suspension of finely divided particles of platinum sulfide utilizable in the preparation of a composite containing the components: an alumina support, combined halogen and finely divided platinum in the ultimate formation of an exceptionally active contact catalyst in which the platinum is distributed uniformly throughout the exposed superficial area of the alumina support.

Still another object of the invention is to prepare a catalyst composite containing alumina, combined halogen, and platinum wherein said components are in intimate juxtaposition uniformly disposed throughout the mass thereof, the platinum in finely divided particles in association with said alumina and said halogen which act not only as support for the platinum but as promotor of its catalytic activity.

A further object of the invention is to provide a platinum-containing catalyst composite which is relatively inexpensive as compared to present platinum composite catalysts by reason of its low platinum content, but which is also relatively more active per unit volume because of the uniform distribution of platinum throughout the entire superficial area of the alumina-halogen support.

One embodiment of the present invention relates to a particular method of preparing a catalyst which comprises: intimately admixing a combined halogen with alumina, compositing therewith finely divided platinum sulfide formed by precipitating said platinum sulfide from a solution of a platinum salt in an aqueous organic solvent and subsequently calcining the resulting alumina-combined halogen-platinum sulfide composite to form said platinum catalyst.

One of the specific embodiments of this invention concerns the preparation of an alumina-combined halogen-platinum composite by precipitating alumina from an aqueous aluminum chloride solution, admixing hydrogen fluoride with said alumina to obtain a composite containing from about 0.1 to about 8% by weight of fluorine in the resulting composite, commingling the last mentioned product with a suspension of finely divided platinum sulfide in an aqueous solution of a water soluble organic solvent formed by contacting hydrogen sulfide with a solution of chloroplatinic acid in said aqueous water soluble organic solvent, drying the resulting composite of alumina, combined halogen and finely divided platinum sulfide and thereafter calcining said composite to reduce the supported platinum sulfide in said composite to finely divided particles of platinum evenly distributed throughout the superficial area of said alumina support.

In another specific embodiment thereof, the present invention relates to a novel composition of matter comprising alumina, finely divided platinum and from about 0.1 to about 5% by weight of a combined halogen.

Platinum containing catalysts and various methods of manufacturing the same have been known in the art, but these catalysts heretofore prepared have received rather limited commercial acceptance because of their high cost of production. The present invention is based upon the discovery that platinum containing composites of exceptional catalytic activity are prepared by precipitating the platinum component of the catalyst in finely divided particles on the surface of an alumina support promoted by a halogen. While these catalysts may contain large concentrations of platinum, which may range up to about 10% by weight or more of the alumina, it has been found that catalysts of exceptional activity may be prepared containing as low as from about 0.01% to about 1% by weight of platinum. The relatively high cost of platinum makes any satisfactory method of reducing the amount of platinum required in the ultimate catalyst composite attractive for the production of catalysts for commercial processes. Since the platinum generally comprises a major proportion of the total cost of the catalyst, a reduction in the amount of platinum required to obtain a product which will possess the desired catalytic activity considerably reduces the ultimate cost of the catalyst.

By reducing the platinum content of the composite by one-half, for example, the cost of the catalyst is substantially reduced by one-half. As a further illustration of the effect of reducing the platinum content of the catalyst, when the quantity of platinum is reduced to about 0.1% by weight of the composite as against about 5% by weight, or more, as heretofore required to provide catalysts of comparable activity, it is readily apparent that the cost of the catalyst is reduced by at least 50 times.

In order, however, to obtain improved results with catalysts containing the low concentrations of platinum as herein specified, it is essential that a particular type of supporting component be composited with the platinum. Observations have shown that alumina shows unexpected advantages as a support for the small quantities of platinum in the ultimate composite, apparently because of some particular chemical or physical association of the alumina with the platinum component. Direct evidence has shown that the specific combination of alumina and the small percentages of platinum in the composite to be not only a very active catalyst, but also to have a long life of catalytic activity. Although the catalyst may show some drop in activity after long periods of service, the particular combination of alumina and finely divided platinum is readily susceptible to regeneration and substantial restoration of its original activity.

The present catalyst composites containing alumina and platinum may be further improved in their catalytic activity by compositing the aforementioned components with chemically combined halogen; that is, halogen in a form capable of producing halide ions in an aqueous solution thereof. It is an integral feature of the present invention, therefore, that the final catalysts contain combined halogen in an amount sufficient to promote the catalytic activity of the platinum component. It has been found, as will be shown in the following examples, that the presence of combined halogen in specified amounts enhances the catalytic activity of the present platinum containing composite and also tends to prolong the life of the catalyst. It is believed that the halogen or halide ion enters into a chemical combination or loose complex with the alumina and/or platinum components to provide the aforesaid promoting and stabilizing effects.

In general, any of the halide ions will serve to effect improved results when incorporated into the alumina-platinum composite to form the present catalyst. The order of preference, however, follows in the order of their increasing atomic numbers; that is, fluoride ions are preferred followed by chloride, bromide and iodide ions. Although any of the above halide ions as combined halogen results in the formation of improved platinum-containing catalysts when incorporated therewith, they are not necessarily equivalent in potency or effect.

In the preparation of the alumina support of the present platinum-containing composite a particularly preferred procedure is to prepare the alumina by adding a suitable alkaline acting reagent, such as ammonium hydroxide, ammonium carbonate, etc. to an aluminum salt, such as aluminum chloride, aluminum sulfate, aluminum nitrate, etc., the respective reactants being desirably commingled and intimately mixed in the form of their aqueous solutions. The amount of each of the reagents is calculated to form the stoichiometric quantity of aluminum hydroxide by the reaction of the base and aluminum salt, which upon drying undergoes chemical dehydration to alumina. For the sake of simplicity and convenience, reference to the term "alumina" in the present specifications and claims will be intended to comprehend the hydrated form of alumina, or aluminum hydroxide as well as alumina itself in order that the percentages referred to herein be uniformly based on alumina free of combined water. Aluminum chloride is generally preferred as the aluminum salt from which the desired alumina component is prepared, not only for reasons of economy and for convenience in the subsequent washing and filtering procedures, but also because this salt appears to give the best results. An alternative method for the preparation of alumina is to react sodium aluminate with aluminum chloride or other suitable aluminum salt, and thereafter separate the alumina and sodium chloride by-product for example, by water washing the soluble salt from the mixture.

Following the preparation of the alumina, usually appearing as a gelatinous or flocculent precipitate in aqueous suspension, a major proportion of the water is removed from the aqueous suspension by filtering, followed by washing the alumina filter cake to remove soluble impurities. The usual washing procedure comprises the addition of water to the alumina, either in combination with filtration or as individual steps. The mechanical aspects of the filtration of alumina precipitate is generally improved when the wash water contains a small quantity of dissolved ammonium hydroxide. The extent or duration of the washing procedure will generally depend upon the particular method employed in preparing the catalyst and will determine the amount of other extraneous ions retained in the alumina. In accordance with one embodiment of the invention, the alumina is thoroughly washed with a sufficient amount of water, preferably water containing ammonium hydroxide, to reduce the chlorine content of the alumina to below about 0.1%. According to another embodiment of the invention, a selective washing procedure may be employed for the purpose of retaining chloride ions in an amount of from about 0.2% to about 1% by weigth of the alumina on a dry basis. In the latter method of preparing the catalyst, or more specifically, the alumina-combined halogen composite, chloride ions are obtained from the original aluminum chloride and are retained by the alumina in the product, thus avoiding the necessity of adding the halide ions in a later step of catalyst preparation. In general, however, it is difficult to control the washing technique to retain the desired amount of halide ion and, for this reason, the preferred procedure comprises washing the alumina to remove substantially all of the chloride ions and thereafter adding the combined halogen as halide ions in a controlled amount. The addition of the combined halogen in this manner permits more rigorous control of the amount of halide ions being added. In another embodiment of the invention, the washing procedure may be selective to retain the chloride ions in an amount constituting a portion of the total combined halogen desired, and subsequently adding the remaining portion of the final desired halide ion content. In this method, the halide ion may comprise the same halide or an admixture of two different halides, as for example, combined chlorine and fluorine.

In some cases it may be desirable to commingle an organic acid, particularly acetic acid, with the alumina or alumina-combined halogen composite for the desirable effect that such acids have on the catalyst, especially its ultimate activity. The acetic acid apparently serves to peptize the alumina and thereby renders it in better condition for compositing with the platinum, and also partly fixes the platinum on the alumina so that migration of the platinum during the subsequent heating stage in the preparation of the catalyst is minimized. The amount of acetic acid, when employed, will generally be within the range of from about 0.05 to about 0.5 mol thereof per mol of alumina treated.

Alumina prepared in accordance with the above procedure, after completion of the washing and filtering steps, is generally recovered as a wet cake which may then be stirred with water to form a slurry and reserved in this condition for subsequent treatment. When the halide ion is to be added separately, it is preferably done at this stage of the catalyst preparation, that is, before the platinum component is composited with the alumina. Although, generally speaking, any suitable procedure may be employed for incorporating the halide ion or combined halogen with the alumina, the combined halogen must be in such form that it will readily react with alumina to form the desired alumina-combined halogen composite and, further, must not leave undesired extraneous deposits on or within the body of the catalyst. The preferred method of introducing the combined halogen into the alumina support is in the form of the corresponding hydrohalide or an aqueous solution thereof; that is, the hydrohalide acids. Hydrogen fluoride is preferably added as the acid for ease in handling and for control of the specific amount added to the alumina. Another satisfactory method of introducing the combined halogen into the alumina support is by adding the halide as the volatile salts thereof, such as ammonium fluoride, ammonium chloride, etc. Ammonia will be removed during the subsequent heating of the catalyst, and therefore, will not leave undesirable deposits within the catalyst. In still another method, the halogen itself may be added as elemental fluorine, chlorine, bromine, or iodine, but because of the normally gaseous physical state of fluorine and chlorine, it is generally preferable to utilize them in the form of their solutions in a suitable solvent for easy handling. In some cases where the inclusion of extraneous components will not be harmful to the catalytic activity of the composite the halogen may be added in the form of some other salts.

The amount of combined halogen in the finished catalyst is maintained within the range of from about 0.1% to about 8% by weight of the alumina on a dry basis. The fluoride ion appears to be somewhat more active than other members of the halide group and, therefore, may be present in a lower concentration, within the range of from about 0.1% to about 3% by weight of the alumina on a dry basis. The amount of chloride ion incorporated into the catalyst composite will be within the range of from about 0.2% to about 8%, preferably from about 0.5% to about 5% by weight of the alumina on a dry basis. Observations have shown that halogen concentrations below the indicated lower limits do not result in the desired improvement and, on the other hand concentrations of halogen above the specified upper limits reduces the selectivity of the catalyst for the desired reactions, usually catalyzing other reactions not particularly desired in the conversion contemplated.

When the alumina and halogen components have been satisfactorily composited or otherwise prepared in intimate association with each other, the platinum component is introduced into the catalyst in accordance with the method herein specified. The platinum component of the catalyst is desirably incorporated into the alumina-combined halogen composite as platinum sulfide particles which, when subsequently calcined, undergo chemical reduction to form platinum. It has been observed that by effecting the precipitation of platinum sulfide from a solution of a water soluble platinum compound dissolved in an aqueous solution of a water miscible organic solvent, such as ethyl alcohol, the precipitated platinum sulfide is much more finely divided and forms a more highly active catalyst when combined in specified amounts with the alumina-combined halogen composite than a similarly composited platinum catalyst in which the platinum sulfide was precipitated from an aqueous solution of a platinum salt in the absence of the organic solvent. The presence of the organic solvent in the aqueous solution of the platinum compound is believed to result in the precipitation of smaller crystals of platinum sulfide when, for example, hydrogen sulfide is led into the solution of the platinum compound to form the sulfide salts or complexes of the platinum ions in solution. The smaller crystal size of the insoluble platinum sulfide enables the latter to penetrate into the minute interstices characterizing the physical structure of the alumina-combined halogen composite or support, providing a catalyst containing a greater total surface area available for contact with charging stock in a subsequent catalyzed reaction involving the platinum-containing catalyst. The larger platinum sulfide particles or crystals formed by precipitation from an entirely aqueous solution of the water soluble platinum compound are necessarily blocked from entering the most minute interstitial spaces in the alumina-combined halogen support and thus do not form a composite therewith having as great a superficial, catalytically active area available for contact with a charging stock in a subsequent conversion reaction in which the resulting platinum-containing composite is utilized as catalyst.

The quantity of water miscible organic solvent required in an aqueous solution of the platinum compound to obtain the effect of small crystal size formation in the precipitation of the platinum sulfide depends to some extent upon the specific solvent employed, but, in general, the concentration of solvent is desirably within the range of from about 20 to about 95% by weight of the water-solvent solution. Utilizable organic solvents include the low molecular weight alcohols, preferably containing fewer than about 5 carbon atoms per molecule, such as methanol, ethanol, propanol, isopropanol, etc.; glycols, such as ethylene glycol, propylene glycol, butylene glycol, glycerol, trimethylene glycol, etc.; glycol ethers, such as the various water soluble ethers such as dioxane as well as those known in commerce as the "cellosolves," including methyl-, ethyl-, propyl- and butyl-Cellosolve; the dialkylene glycols and their partial esters or their uniform and mixed ethers, such as diethylene glycol and the corresponding Carbitols thereof, such as butyl Carbitol; cyclic ethers, such as dioxane; ketones, such as acetone, ethylmethylketone, etc.; esters, such as methyl- and ethylformate, methyl and ethylacetate, etc. If desired, a mixture of organic solvents may be utilized, for example, to increase the water solubility of one or more organic solvents, such as a mixture of methanol and butyl acetate in aqueous solution.

The suspension of finely divided platinum sulfide utilized for the purpose of admixing with the alumina-combined halogen composite to thereby introduce the platinum component into the composite which upon calcination is converted to an association of alumina, combined halogen and platinum, is generally prepared by leading gaseous hydrogen sulfide into a solution of a water-soluble platinum compound, such as chloroplatinic acid dissolved in a solution of water and said organic solvent. The quantity of hydrogen sulfide required to convert the platinum ion to the insoluble platinum sulfide is usually determined by the color of the resulting solution as the hydrogen sulfide is led into the liquid. Upon addition of the hydrogen sulfide gas to the normally light yellow solution of chloroplatinic acid at room temperature the color gradually changes to a dark brown. Precipitation of platinum sulfide is complete when the solution attains a constant coloration and the supernatant liquid becomes relatively clear. Although the precipitate has been designated as platinum sulfide, the term is merely used generically to specify the one or more complex platinum compounds containing sulfur which precipitate on the addition of hydrogen sulfide to an aqueous solution of a platinum compound. The sulfuretted hydrogen or its equivalent, as an aqueous solution thereof or a solution of its salts may likewise be utilized to precipitate the platinum sulfide, such as a saturated aqueous solution of hydrogen sulfide or an aqueous solution of ammonium sulfide, sodium sulfide or other water-soluble sulfide salts capable of double decomposition with the water-soluble platinum compound to yield platinum sulfide. In preparing the alumina-combined halogen and platinum sulfide composite, the brown colored aqueous suspension of colloidal platinum sulfide is commingled with the slurry of wet alumina gel at room temperature and the slurry sufficiently stirred to obtain intimate mixing of the suspended particles which are then dried and calcined.

Although the above described method for manufacturing the catalyst of the present invention is the preferred method, active catalysts can be prepared by combining a slurry of the wet alumina gel containing the desired quantity of halogen ions with a solution of a water-soluble platinum compound dissolved in a solution of water and of an organic solvent passing hydrogen sulfide through the commingled solution to produce a colloidal platinum sulfide heating the material to remove the excess water, pilling the resulting product, and thereafter calcining the pilled material to produce the final catalyst composite.

The preferred catalysts of the present invention contained platinum in an amount of from about 0.01% to about 1% by weight of platinum and in the preparation of the platinum sulfide composite, the quantity of precipitated platinum in suspension is adjusted to obtain a final composite containing the above preferred amount of platinum.

It has been found that the best results are obtained when the platinum is composited with alumina before the alumina is subjected to substantial heating. As the following examples will show, a higher octane product was obtained in the use of the catalyst in a hydrocarbon reforming operation when the platinum sulfide was composited with alumina gel as compared to a smaller compositing procedure in which the alumina had been previously dried and formed into pills.

After the platinum in proper concentration has been commingled with the alumina, the mixture is preferably dried at a temperature of from about 100° to about 200° C. for a period of from about 4 to 24 hours or more to form a cake. In some cases it is desired to prepare the catalyst in the form of pills of uniform size and shape, and this may readily be accomplished by grinding the partially dried catalyst cake, adding a suitable lubricant, such as stearic acid, rosin, hydrogenated coconut oil, graphite, etc., and then forming into pills in any suitable pelleting apparatus. Particularly satisfactory pills comprise those of a size ranging from about ⅛" x ⅛" to ¼" x ¼" or thereabouts. Pills of uniform size and shape may also be formed by extrusion methods. In some cases it may be desired to utilize the catalyst as powder of granules of irregular size and shape, in which case the pilling and extrusion operations may be omitted.

The catalyst may now be subjected to high temperature treatment or calcination, and this may be effected by any one of several methods. The preferred method is to subject the catalyst to calcination at a temperature of from about 400° to about 650° C. for a period of from about 2 to 8 hours or more. Another method is to subject the catalyst to reduction with hydrogen or a hydrogen-containing gas at a temperature of from about 150° to about 300° C. for about 4 to 12 hours or more, preferably followed by calcination at a temperature of from about 400 to about 650° C. In still another method the catalyst may be subjected to reduction with hydrogen or hydrogen-containing gas at a temperature of from about 400° to about 650° C. for a period of from about 2 to 10 hours or more.

In some cases the lubricant will be removed during the high temperature heating. In other cases, as for example, when graphite is used as the lubricant, the separate high temperature heating step may be omitted, and the effective heat treatment of the catalyst may be obtained in the plant before or during processing of the hydrocarbons.

Although the catalyst of the present invention will have a long life, it may be necessary to regenerate the catalyst after long periods of service. The regeneration may be effected by treatment with air or other oxygen-containing gas to burn carbonaceous deposits therefrom. In general, it is preferred to control the regeneration temperature not to exceed about 650° C. In some cases it may be desirable to follow the burning operation with treatment with hydrogen-containing gas at temperatures of from about 350° to about 600° C.

The improved catalyst of the present invention may be employed in any process for which platinum is a catalyst. The improved catalysts are particularly satisfactory for reforming operations in which a saturated gasoline, such as straight run gasoline, natural gasoline, etc., is subjected to conversion to produce a reformed gasoline of improved antiknock properties. The saturated gasoline generally comprises a mixture of naphthenic and paraffinic hydrocarbons and the reforming operation effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur, such as isomerization, hydrogen transfer, etc. The controlled or selective cracking is desirable because it further increases the octane number of the reformed gasoline, produces a gasoline of lower volatility and converts higher boiling fractions to lower boiling fractions within the range of gasoline. However, this cracking must be controlled because excessive cracking produces excessive normally gaseous products and also excessive carbonaceous deposits on the catalyst, and results in its deactivation. The improved catalysts of the present invention are particularly desirable for reforming operations because the catalyst effects the desired aromatization and controlled cracking under selected conditions of operation.

The catalyst of the present invention may also find utility in treatment of higher boiling saturated petroleum fractions such as kerosene, gas oil, etc. In many cases it is desirable to produce a highly aromatic product from kerosene useful as a solvent, and the present invention is readily applicable for this purpose. The gasoline, kerosene, etc. fractions comprise a mixture of different hydrocarbons and, in accordance with the invention, the full boiling range material or any selected fraction thereof may be subjected to the desired conversion when a selected fraction is so treated, it may be blended, all or in part, with other fractions.

The catalyst of the present invention may prove particularly useful for destructive hydrogenation of hydro-cracking reactions in which hydrocarbons and particularly oil heavier than gasoline is subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting hydrogenation reactions including the hydrogenation of unsaturated aliphatic hydrocarbons, such as mono-olefins, di-olefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding olefin oxides, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the novel catalysts. In reactions involving hydrogenation, oxidation or condensation, it is preferred that the halogen content of the catalyst be within the lower limits of the ranges hereinbefore specified in order to minimize side reactions.

As set forth above, selected processing conditions are required depending upon the particular reaction desired. For reforming of straight run gasoline the temperature employed should be within the range of from about 300° to about 600° C., the pressure within the range of from about 50 to about 1000 pounds per square inch and the weight hourly space velocity within the range of from about 0.5 to about 10. For dehydrogenation of normal butane the temperature should be within the range of from about 400° to about 1100° C. the pressure from about atmospheric to about 50 pounds per square inch and the gaseous hourly space velocity from about 200 to about 5000. For hydrogenation reactions the temperature may range from atmospheric to about 250° C., the pressure from about 100 to about 3000 pounds or more, and the weight hourly space velocity from about 0.5 to 5. The weight hourly space velocity is defined as the weight of oil per hour weight of catalyst in the reaction zone.

In one embodiment of the process, sufficient hydrogen will be produced in the reforming reaction to furnish the hydrogen required in the process, and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the catalyst, and it is within the scope of the present invention to treat the hydrogen containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into the reaction zone as a slurry in the hydrocarbon oil.

The following examples are introduced to further illustrate the novelty and utility of the present invention but not to unduly limit the same. These examples are comparative; the data was obtained on three catalysts designated as catalyst A, B and C. The data presented for the runs employing catalysts A and B are included herein to illustrate the enhancement in activity resulting from the inclusion of specific amounts of fluorine in the final catalyst. The catalysts were prepared in the following manner:

A master batch of alumina was prepared by precipitating the alumina from a solution of aluminum chloride using ammonium hydroxide as the precipitant. The resulting material was washed to remove the soluble compounds contained therein and thereafter filtered. The filtered material was separated into two batches. Batch 1 was slurried with water and hydrofluoric acid added in amounts sufficient to give a final catalyst containing about 0.4% fluorine. Batch 2 was also slurried and a larger amount of hydrofluoric acid added to give a final catalyst containing 0.75% fluorine. Hydrogen sulfide was passed into an aqueous solution of platinic chloride to produce a colloidal suspension of platinum sulfide. This suspension was added to the slurry of batch 1 and the resulting mixture heated to drive off excess volatile matter. This material was then pilled and the pills calcined. This catalyst was then designated as catalyst A. Catalyst B was prepared in the same manner with the exception that the slurry employed was ½ of batch 2 containing the higher concentration of fluorine. Catalyst C was prepared by passing hydrogen sulfide through a solution of platinic chloride dissolved in aqueous ethyl alcohol to produce a colloidal suspension of a platinum compound and the colloidal suspension added to the remaining ½ portion of the slurry of batch 2. This material was thereafter heated to drive off the excess moisture, pilled and calcined to produce the final catalyst composite designated as catalyst C.

The following results were obtained upon reforming Mid-Continent naphtha fraction having a boiling range of 182 to about 400° F. The reforming operation was conducted under a pressure of 500 pounds per square inch gauge and a 3:1 hydrogen hydrocarbon ratio and a liquid space velocity of 2.

*Table*

| Example | Chg. Stk. | Catalyst A | | | Catalyst B | | | Catalyst C | | |
|---|---|---|---|---|---|---|---|---|---|---|
| | | 1st Day | 2nd Day | 3rd Day | 1st Day | 2nd Day | 3rd Day | 1st Day | 2nd Day | 3rd Day |
| Composition on basis of input, percent by weight: | | | | | | | | | | |
| Al$_2$O$_3$ | | | 99.33 | | | 98.95 | | | 98.95 | |
| Pt | | | 0.30 | | | 0.30 | | | 0.30 | |
| F | | | 0.37 | | | 0.75 | | | 0.75 | |
| Yield, Volume Percent of Charge | | 92.6 | 92.7 | 93.1 | 92.4 | 92.9 | 92.9 | 92.0 | 92.1 | 92.5 |
| Octane Number: | | | | | | | | | | |
| F-2 Clear | 34.6 | 68.2 | 68.0 | 68.0 | 74.4 | 74.4 | 74.0 | 77.6 | 76.9 | 77.6 |
| F-2+3 cc. TEL/Gal | 59.1 | | 81.8 | | | 86.0 | | | 86.6 | |
| F-1 Clear | 34.8 | 74.4 | 74.7 | 74.1 | 81.0 | 81.0 | 80.8 | 85.7 | 85.3 | 85.4 |
| F-1+3 cc. TEL/Gal | 60.3 | 88.1 | | 88.2 | 91.4 | | 91.5 | 95.0 | | 94.7 |
| Percent Aromatics in product based on Charge | 7.0 | 44.7 | 41.3 | 42.1 | 46.1 | 43.2 | 43.3 | 44.9 | 45.0 | 45.0 |
| Percent Boiling below 212° F. based on total liquid product | 3.0 | 10.5 | 11.5 | 11.5 | 19.0 | 21.0 | 21.0 | 27.0 | 28.5 | 28.5 |

I claim as my invention:

1. A process for preparing a supported platinum catalyst wherein the platinum component thereof is evenly distributed in a finely divided form on the exposed superficial area of the support which comprises compositing from about 0.1% to about 8% by weight of combined halogen with alumina by admixing the alumina with an aqueous solution of a water-soluble halogen compound, thereby forming a halogen-containing alumina support, precipitating colloidal platinum sulfide by adding a sulfiding agent to a solution of a water soluble platinum compound in an aqueous solution containing from about 20 to about 95% of a water soluble organic solvent, compositing said platinum sulfide with said halogen containing alumina support in an amount to form a final catalyst containing from about 0.01% to about 1% by weight of platinum, and thereafter calcining the resulting support containing said platinum sulfide at a temperature of from about 400° to about 650° C.

2. The process of claim 1 further characterized in that said organic solvent is an alcohol containing fewer than 5 carbon atoms per molecule.

3. The process of claim 1 further characterized in that said organic solvent is ethyl alcohol.

4. The process of claim 1 further characterized in that said halogen is combined fluorine.

5. A process for preparing an alumina-combined halogen-platinum composite catalyst, wherein the platinum component thereof is evenly distributed in a finely divided form on the exposed superficial area of the alumina-combined halogen support which comprises precipitating alumina from an aqueous solution of a water soluble aluminum salt, admixing said alumina with from about 0.1% to about 8% by weight of combined halogen in the form of an aqueous solution of a water soluble compound containing combined halogen, recovering the resulting alumina containing said combined halogen, commingling the resulting composite with an aqueous organic solvent suspension of precipitated finely divided platinum sulfide formed by adding a sulfiding agent to a solution of a water soluble platinum compound in an aqueous solution containing from about 20 to about 95% by weight of an organic solvent miscible in water, said platinum sulfide being in an amount to form a final catalyst containing from about 0.01% to about 1% by weight of platinum, recovering the resulting composite containing alumina, combined halogen and platinum sulfide and heating said composite at a temperature of from about 400° to about 650° C. to calcine the components thereof.

6. The process of claim 5 further characterized in that said water soluble compound containing combined halogen is hydrofluoric acid.

7. A method of preparing a catalyst which comprises precipitating alumina from an aqueous solution of aluminum chloride, washing the recovered alumina with water containing ammonium hydroxide to remove chloride ions to below about 0.1% by weight of said alumina, adding thereto a solution of hydrofluoric acid in an amount to form a final catalyst composite containing from about 0.1 to about 3% by weight of combined fluorine, based on said alumina, separately precipitating colloidal platinum sulfide from a solution of a water soluble platinum compound in an aqueous solution containing from about 20 to about 95% by weight of a water soluble organic solvent by commingling said solution of water soluble platinum compound with hydrogen sulfide, admixing resulting suspension of finely divided platinum sulfide with said previously formed alumina containing combined fluorine wherein the amount of platinum sulfide is sufficient to result in a final catalyst containing from about 0.01% to about 1% by weight of platinum, recovering the resulting composite of alumina, combined halogen and platinum sulfide and thereafter heating the composite to a temperature of from about 400° to about 650° C.

8. In a method of catalyst manufacture wherein a platinum compound is composited with alumina and combined halogen and the resultant mixture calcined, the improvement which comprises precipitating said compound as colloidal platinum sulfide by adding a sulfiding agent to a solution of a water soluble platinum compound in an aqueous solution containing from about 20 to about 95% of a water soluble organic solvent.

9. The improvement of claim 8 further characterized in that said organic solvent comprises ethyl alcohol.

10. A process for preparing a catalyst which comprises commingling with alumina an aqueous solution of a hydrogen halide in an amount to composite from about 0.1% to about 8% by weight of halogen with the alumina on a dry basis, adding hydrogen sulfide to a solution of a water soluble platinum compound in an aqueous solution containing from about 20 to about 95% of a water soluble organic solvent to precipitate colloidal platinum sulfide, compositing said platinum sulfide with said alumina in an amount to form a final catalyst containing from about 0.01% to about 10% by weight of platinum, and calcining the resultant composite at a temperature of from about 400° to about 650° C.

11. The process of claim 10 further characterized in that said aqueous solution of a hydrogen halide is hydrofluoric acid.

12. The improvement of claim 8 further characterized in that said sulfiding agent comprises hydrogen sulfide.

VLADIMIR HAENSEL.

REFERENCES CITED

The following references are of record in the file of this patent:

UNITED STATES PATENTS

| Number | Name | Date |
|---|---|---|
| 612,614 | Porter | Oct. 18, 1898 |
| 2,005,412 | Connolly et al. | June 18, 1935 |
| 2,194,186 | Pier et al. | Mar. 19, 1940 |